US008831354B1

(12) United States Patent
Faroudja et al.

(10) Patent No.: US 8,831,354 B1
(45) Date of Patent: Sep. 9, 2014

(54) SYSTEM AND METHOD FOR EDGE-ADAPTIVE AND RECURSIVE NON-LINEAR FILTERING OF RINGING EFFECT

(71) Applicant: Faroudja Enterprises, Inc., Los Altos, CA (US)

(72) Inventors: Yves Faroudja, Los Altos, CA (US); Ka Lun Choi, Los Altos, CA (US); Xu Dong, Los Altos, CA (US)

(73) Assignee: Faroudja Enterprises, Inc., Los Altos, CA (US)

( * ) Notice: Subject to any disclaimer, the term of this patent is extended or adjusted under 35 U.S.C. 154(b) by 0 days.

(21) Appl. No.: 14/150,688

(22) Filed: Jan. 8, 2014

(51) Int. Cl.
*G06K 9/66* (2006.01)
*G06K 9/48* (2006.01)
*G06K 9/40* (2006.01)
*G06T 5/00* (2006.01)
*G06T 7/00* (2006.01)

(52) U.S. Cl.
CPC ............... *G06T 5/002* (2013.01); *G06T 7/0085* (2013.01)
USPC ........... 382/190; 382/199; 382/254; 382/260; 382/261

(58) Field of Classification Search
None
See application file for complete search history.

(56) References Cited

U.S. PATENT DOCUMENTS

| 5,819,035 | A | * | 10/1998 | Devaney et al. | ............... | 709/202 |
| 5,852,475 | A | * | 12/1998 | Gupta et al. | ................... | 348/606 |
| 5,940,536 | A | * | 8/1999 | Wake et al. | .................... | 382/205 |
| 6,041,145 | A | * | 3/2000 | Hayashi et al. | ................ | 382/268 |
| 6,728,416 | B1 | * | 4/2004 | Gallagher | ...................... | 382/265 |
| 7,339,601 | B2 | * | 3/2008 | Kim | ................... | 345/690 |
| 7,593,588 | B2 | * | 9/2009 | Sugeno et al. | ................ | 382/266 |
| 2003/0128888 | A1 | * | 7/2003 | Li | ................... | 382/260 |
| 2004/0156559 | A1 | * | 8/2004 | Cheng et al. | ................... | 382/286 |
| 2005/0100241 | A1 | * | 5/2005 | Kong et al. | .................... | 382/268 |
| 2007/0076972 | A1 | * | 4/2007 | Chiu | ............................ | 382/261 |

* cited by examiner

*Primary Examiner* — Andrae S Allison
(74) *Attorney, Agent, or Firm* — Invent Capture, LLC.; Samuel S. Cho

(57) ABSTRACT

One or more systems and methods for edge-adaptive and recursive non-linear filtering of ringing effect on image or video data are disclosed in accordance with various embodiments of the invention. In one embodiment of the invention, a method for edge-adaptive and recursive non-linear filtering of ringing effect first involves detecting all edges within a process area of an image, including a direction of an edge slope and a value of an edge signal level. Then, if the process area is determined to be a "non-busy" area based on a "busyness" measure relative to empirically-defined threshold values, then an edge influence function subsequently determines whether to apply a de-ringing filter to a current pixel within the process area or not. Preferably, the de-ringing filter is edge-adaptive, non-linear, and recursive. The de-ringing filter can adjust the current pixel multiple times based on filter angles, adjacent pixels, and pixel transition levels.

24 Claims, 4 Drawing Sheets

A flowchart for edge-adaptive and recursive non-linear filtering of ringing effect from a frame An example of undesirable ringing effect called "mosquito noise" around edges of objects that include high pixel transition levels

200

An example of reduced ringing effect (i.e. reduced "mosquito noise") on the objects after applying an edge-adaptive and recursive non-linear filter in accordance with an embodiment of the invention A flowchart for edge-adaptive and recursive non-linear filtering of ringing effect from a frame A system block diagram for edge-adaptive and recursive non-linear filtering of ringing effect

400

SYSTEM AND METHOD FOR EDGE-ADAPTIVE AND RECURSIVE NON-LINEAR FILTERING OF RINGING EFFECT

BACKGROUND OF THE INVENTION

The present invention generally relates to image and video processing. More specifically, the present invention relates to one or more methods for edge-adaptive and recursive non-linear filtering of ringing effect and "mosquito noise" artifacts on images and video. Furthermore, the present invention also relates to one or more computerized systems that can operate and execute a method for edge-adaptive and recursive non-linear filtering of ringing effect and "mosquito noise" artifacts on various types of images and videos, regardless of which multimedia standards are utilized for encoding, decoding, compression, and/or decompression of various types of images and videos.

In image and video signal processing, a "ringing effect" is an undesirable and inaccurate visual clutter that tends to appear in contrasting pixel transition levels in an image. Sometimes also called "Gibbs effect," or "mosquito noise" if the ringing effect is multi-dimensional, the ringing effect is generally caused by sharply filtering a wide-bandwidth signal. An image in a compressed format, for example, is subject to heavy quantization after a discrete cosine transform (DCT), and tends to exhibit the ringing effect. Furthermore, today's compression schemes for video signals inherently utilize low-pass filters in horizontal, vertical, and/or temporal domains. Unfortunately, the utilization of conventional linear low-pass filters also tends to distort the visual impact of an image transition, such as a transition from a darker area to a brighter area of an image sequence in a video file.

With popularity of JPEG (Joint Photographic Expert Group) and MPEG (Moving Picture Experts Group) formats in the last twenty years in digitized imaging and videos for computers, televisions, and other electronic devices, a number of conventional de-ringing filters have been devised to reduce the ringing effects in images and videos. The conventional de-ringing filters generally utilize linear low-pass filters and micro blocks to reduce the ringing effects. However, these conventional de-ringing filters have several disadvantages and inconveniences.

For example, a conventional de-ringing filter is typically designed in a loop with other image or video processing steps, and cannot easily be separated from the rest of the image or video processing steps. In many cases, separation of the conventional de-ringing filter from other image or video processing steps is not feasible. Therefore, conventional methods of reducing single or multi-dimensional ringing effects often involve an image or video compression standard-specific de-ringing filter. Utilizing a conventional image or video compression standard-specific de-ringing filter may be often inconvenient, cumbersome, or impractical in today' image and/or video processing systems that are supposed to handle a wide variety of image and video compression standards. Furthermore, in many instances, multi-dimensional ringing effects (e.g. dotted haze as "mosquito noise" in horizontal and vertical domains, flickers in some video data involving horizontal, vertical, and time domains, and etc.) are difficult to reduce using a conventional linear de-ringing filter, because finding a block edge after decoding a compressed image or video is often difficult.

In addition, in case of MPEG files, the motion compensation in MPEG video processing makes the multi-dimensional ringing effects (e.g. dotted haze in a frame, flickers in a plurality of frames in video data, other mosquito noise, and etc.) less evident in the original blocks, which in turn causes block-based conventional de-ringing filters less effective in removing the ringing effects. Moreover, conventional linear low-pass filters used as de-ringing filters typically reduce the resolution of the original image content while filtering out the ringing effects, because the conventional linear low-pass filters typically lower the quality of high-frequency content transitions. Furthermore, conventional linear low-pass filters are also unable to reduce high frequencies without introducing echoes or multiple repetitions of the original transition in decreasing levels for a decoded image or video content due to Gibbs effect.

Although certain conventional filters, such as various types of Gaussian filters, do not exhibit ringing effect, their frequency response is generally considered too progressive for effective application without substantial corrective algorithms in a video processing system. Furthermore, when low-pass filtering is required in more than one dimension—in the horizontal and vertical domains, for example—the ringing artifacts due to the two low-pass filters can create interference artifacts that appear as minima and maxima of brightness. These interference artifacts appear as the "mosquito noise" in a video footage. The mosquito noise is particularly pronounced in marginally-performing video compression and decompression devices that exhibit multiple performance compromises, which often act like a series of low-pass filters in multiple dimensions due to a need for a minimal bit-rate of each compressed image.

Some video compression standards, such as MPEG2 which is used for most digital broadcast television, do not include any provisions to reduce mosquito noise. More recent compression standards, such as HEVC, do include provisions to reduce these artifacts, mostly by an in-loop process in the encoder. However, because the older MPEG2 standard and other video and imaging compression standards are still widely used, providing a novel de-ringing filter that can reduce or filter out ringing effects for a wide variety of image and/or video compression standards may be highly desirable.

Furthermore, because there is also a growing demand for higher bandwidth in video processing, it may be also desirable to provide a non-linear, edge-adaptive, and compression standard-independent de-ringing filter that can effectively reduce undesirable ringing artifacts for a variety of video and imaging compression standards. Moreover, it may also be desirable to provide the non-linear, edge-adaptive, and compression standard-independent de-ringing filter as a process that can be executed on various forms of electronic hardware and software. In addition, it may be also be desirable to provide a related computer-implemented method for a non-linear and edge-adaptive recursive filtering of ringing effects in image and video processing.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a method for edge-adaptive and recursive non-linear filtering of ringing effect on video or image data is disclosed. This method comprises steps of: executing a ringing effect detection and filtering decision process and an edge-adaptive and recursive non-linear de-ringing filtering process on a memory unit and at least one of a programmable device and another hardware device, wherein the ringing effect detection and filtering decision process defines a process area including a current pixel for analysis; detecting and counting one or more edges above an edge size threshold value in the process area by executing an edge detection process as part of the ringing effect detection and filtering decision process executed on the memory unit and at least one of the programmable device and another hardware device; determining whether the process area is a "non-busy" area or a "busy" area, based on a "busyness" measure relative to empirically-defined threshold values and the one or more edges counted from the edge detection process; and when the process area is the "non-busy" area: determining whether a counted and identified edge has sufficient influence to the current pixel by utilizing an edge influence function, which is positively proportional to a signal value of a large edge, and inversely proportional to a distance between the current pixel and another pixel on the counted and identified edge; and when the counted and identified edge is determined to have the sufficient influence to the current pixel: filtering the current pixel by utilizing the edge-adaptive and recursive non-linear de-ringing filtering process that are angle-adaptive for horizontal, vertical, and diagonal angles for the current pixel.

Furthermore, in another embodiment of the invention, a system for edge-adaptive and recursive non-linear filtering of ringing effect on video or image data is disclosed. This system comprises: a detection and decision unit comprising an edge detection unit, a busyness decision unit, and an edge influence decision unit, wherein the detection and decision unit receives image or video data as input, and wherein the detection and decision unit is executed on a memory unit and at least one of a programmable device and another hardware device; an edge-adaptive and recursive non-linear de-ringing filter that recursively places a filtered value in a current pixel within a process area to reduce or remove the ringing effect on the current pixel, wherein the filtered value is recursively adjusted by being edge-adaptive and angle-adaptive with horizontal, vertical, and diagonal angles, when the detection and decision unit decides to adjust the current pixel within the process area under analysis; a data storage storing the filtered value from the edge-adaptive and recursive non-linear de-ringing filter; and the memory unit and at least one of the programmable device and another hardware device.

DETAILED DESCRIPTION

Figure 1:
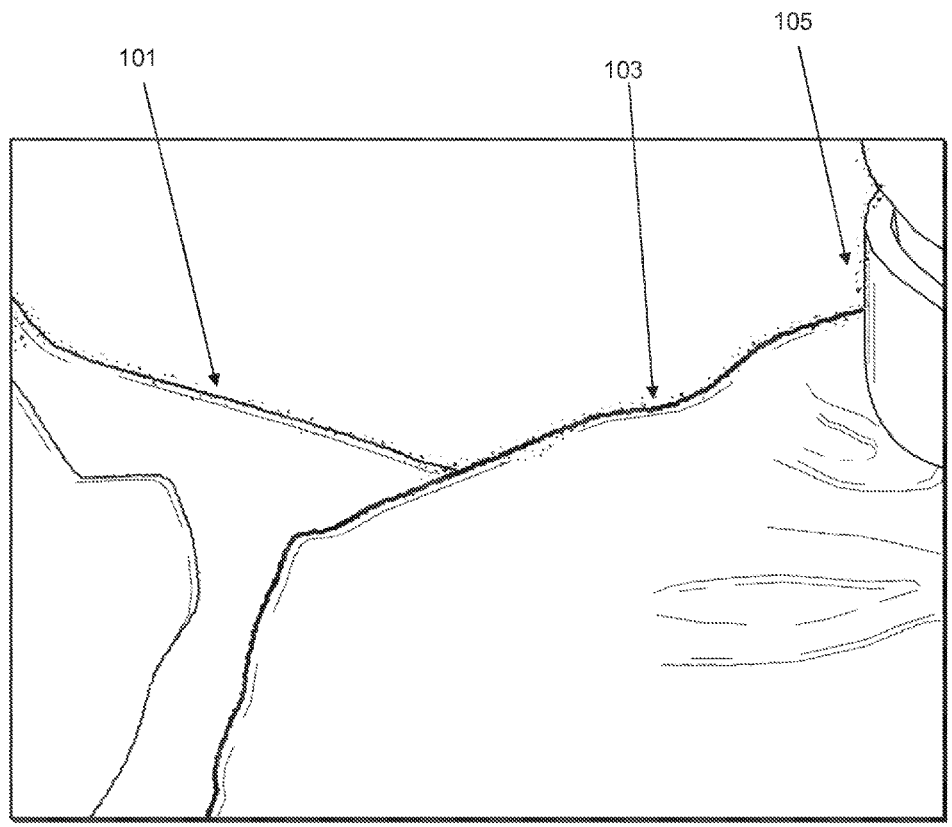
FIG. 1 shows an example of an undesirable ringing effect called "mosquito noise," which is noticeable around edges of objects that include high pixel transition levels.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble systems and methods for edge-adaptive and recursive non-linear filtering of ringing effect in images and videos. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "ringing effect" is defined as an undesirable and inaccurate visual clutter that tends to appear in contrasting pixel transition levels in a still or moving image in at least one of a horizontal domain, a vertical domain, and a time domain. In context of the present invention, the "ringing effect" may involve one or more dimensions. The term "ringing effect" may be interchangeably used with "Gibbs effect." In general, the ringing effect is caused by sharply filtering a wide-bandwidth signal and also by utilizing a conventional low-pass filter in image and/or video processing.

In addition, a term "mosquito noise" is defined as a "multi-dimensional" ringing effect, which involves at least two of a horizontal domain, a vertical domain, and a time domain. If the horizontal domain and the vertical domain are involved in creation of the mosquito noise, visual distortions may appear like dotted haze around edges of a single frame (i.e. a still image). On the other hand, if the horizontal domain, the vertical domain, and the time domain in video data are involved in creation of the mosquito noise, then peak patterns from the video data due to the mosquito noise may appear as undesirable flickers.

Furthermore, for the purpose of describing the invention, a term "de-ringing filter" is defined as a functional unit that provides reduction, filtering, and/or removal of undesirable ringing effects, mosquito noise, and/or Gibbs effects, which are typically associated with decoded image data or video data. In one example, the functional unit serving as a de-ringing filter may be implemented by a software program executed on a programmable device and/or another hardware device, such as a graphics processor unit (GPU), a field programmable gate array (FPGA), a central processing unit (CPU), and a memory unit of a computing device or another electronic device. Examples of the computing device include, but are not limited to, a notebook computer, a desktop computer, a portable electronic device, a mobile device, a tablet computer, and a television. In another example, the functional unit serving as a de-ringing filter may be at least partially hardwired and/or embedded codes operating in an application-specific integrated circuit (ASIC), or another semiconductor chip that loads the hardwired and/or embedded codes.

ASIC's or other semiconductor chips that hardwire and/or embed the functionality of the de-ringing filter may be utilized in televisions and other electronic devices. In a preferred embodiment of the invention, the de-ringing filter is non-linear, recursive, and edge-adaptive. Furthermore, in the preferred embodiment of the invention, the de-ringing filter may be independent of a particular compression standard.

In addition, for the purpose of describing the invention, a term "detection and decision unit" is defined as a functional unit that is capable of detecting undesirable ringing effects, and is also capable of deciding to apply or not apply a de-ringing filter based on a non-linear, recursive, and edge-adaptive detection and decision algorithm incorporated in one or more embodiments of the invention. In one example, the detection and decision unit may be implemented by a software program executed on a programmable device and/or another hardware device, such as a graphics processor unit (GPU), a field programmable gate array (FPGA), a central processing unit (CPU), and a memory unit of a computing device or another electronic device.

In another example, the detection and decision unit may be at least partially hardwired and/or embedded codes operating in an application-specific integrated circuit (ASIC), or another semiconductor chip that loads the hardwired and/or embedded codes. ASIC's or other semiconductor chips that hardwire and/or embed the functionality of the detection and decision unit for a de-ringing filter may be utilized in televisions and other electronic devices.

Moreover, for the purpose of describing the invention, a term "edge detection" is defined as a process of searching, identifying, and/or counting a number of edges within a process area of the detection and decision unit for determining a need to apply a de-ringing filter or not. Typically, the process area includes a "current" pixel, which is currently analyzed by the detection and decision unit, and also includes neighboring or adjacent pixels next to or near the current pixel. In a preferred embodiment of the invention, for each current pixel, a novel edge detection algorithm searches for all edges within the process area, including directions of each edge slope and values of each edge signal level. In general, edges of large amplitude are typically identified and counted by the edge detection algorithm. The identified and counted large edges are then used in subsequent filtering decision processes.

Furthermore, for the purpose of describing the invention, a term "busyness" is defined as having many detailed and fine textures in a process area that includes a current pixel being analyzed and adjacent pixels near the current pixel. In general, the process area is a portion of still or moving image data for determining a need to apply a de-ringing filter or not. In a preferred embodiment of the invention, a "busyness" decision unit determines whether the process area is a "non-busy" area or a "busy" area, based a "busyness" measure relative to empirically-defined threshold values. In the preferred embodiment of the invention, if the process area is determined to be "non-busy," then, a subsequent process, such as an edge influence function, is utilized to further determine the need for applying the de-ringing filter. On the other hand, if the process area is determined to be too "busy" relative to the empirically-defined threshold values, then the busyness decision unit may decide not to filter the current process area, and move on to a next process area for analysis.

In addition, for the purpose of describing the invention, a term "edge influence decision" is defined as a process of utilizing a novel "edge influence function" to determine whether each edge has sufficient influence to a current pixel being analyzed by an edge-adaptive detection and decision algorithm. In a preferred embodiment of the invention, at least some edges determined to have sufficient influence to the current pixel may trigger the current pixel to be filtered by an edge-adaptive and recursive non-linear de-ringing filter Furthermore, in the preferred embodiment of the invention, if there are a plurality of edges in the process area including the current pixel, then the current pixel may be filtered multiple times by the edge-adaptive and recursive non-linear de-ringing filter.

One aspect of an embodiment of the present invention is providing a novel non-linear, edge-adaptive, and compression standard-independent de-ringing filter that can effectively reduce undesirable ringing artifacts for a variety of video and imaging compression standards.

Another aspect of an embodiment of the present invention is providing a novel non-linear, edge-adaptive, and compression standard-independent de-ringing filter as a computer-implemented process that can be executed on a memory unit and at least one of a GPU, an FPGA, a CPU, or another hardware device, or on an application specific integrated circuit (ASIC).

Yet another aspect of an embodiment of the present invention is providing a novel computer-implemented method for a non-linear and edge-adaptive recursive filtering of ringing effects in image and video processing.

FIG. 1 shows an example (100) of an undesirable ringing effect called "mosquito noise," which is noticeable around edges (101, 103, 105) of objects (e.g. pictures of shirts) that include high pixel transition levels. In this example (100), the undesirable ringing effect is shown near the edges (101, 103, 105) of the objects as dotted haze surrounding each edge. This inaccurate visual clutter, known as the ringing effect, the mosquito noise, or the Gibbs effect, typically occurs in contrasting pixel transition levels in decoded and/or decompressed image or video data.

Furthermore, the ringing effect is generally caused by sharply filtering a wide-bandwidth signal. An image or a video in a compressed format, for example, is subject to heavy quantization after a discrete cosine transform (DCT), and tends to exhibit mosquito noise (i.e. multi-dimensional ringing effect). Moreover, today's compression schemes for video signals typically utilize low-pass filters in horizontal, vertical, and/or temporal domains. The utilization of conventional linear low-pass filters also tends to distort the visual impact of an image transition, such as a transition from a darker area to a brighter area of an image sequence in a video file.

Figure 2:
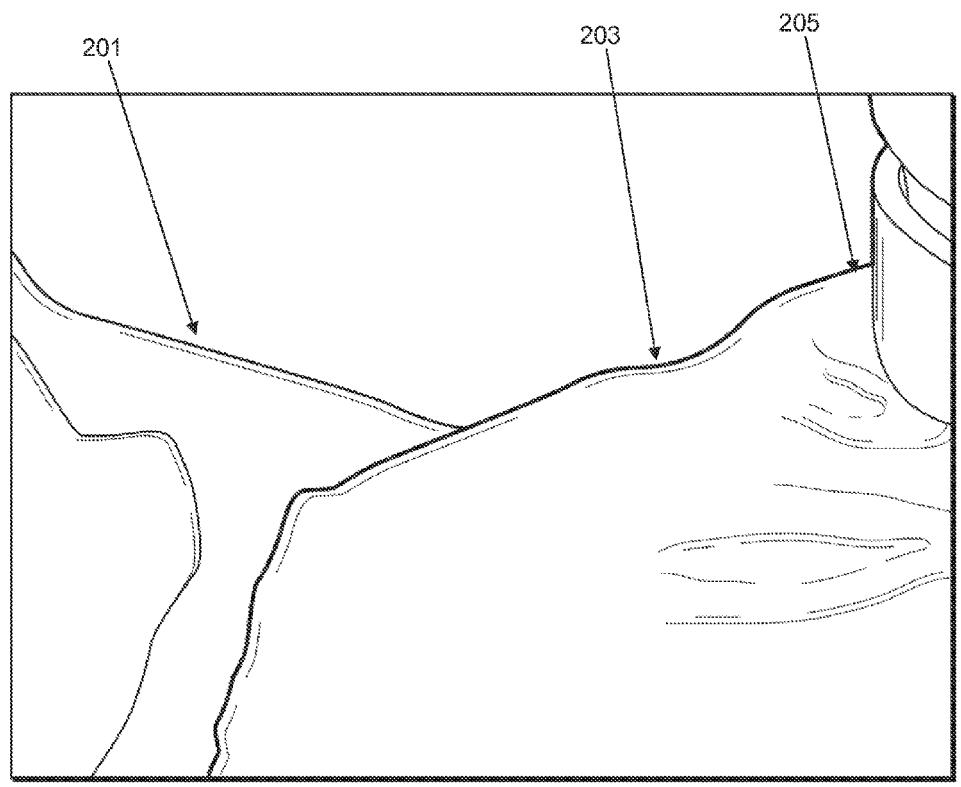
FIG. 2 shows an example of reduced ringing effect after applying an edge-adaptive and recursive non-linear filter in accordance with an embodiment of the invention.

FIG. 2 shows an example (200) of reduced and/or eliminated ringing effect after applying an edge-adaptive and recursive non-linear filter in accordance with an embodiment of the invention. In the example (200) as shown in FIG. 2, edges (201, 203, 205) of objects that previously showed dotted haze surrounding each edge in FIG. 1 are now crisper and cleaner, without presence of the dotted haze.

Figure 3:
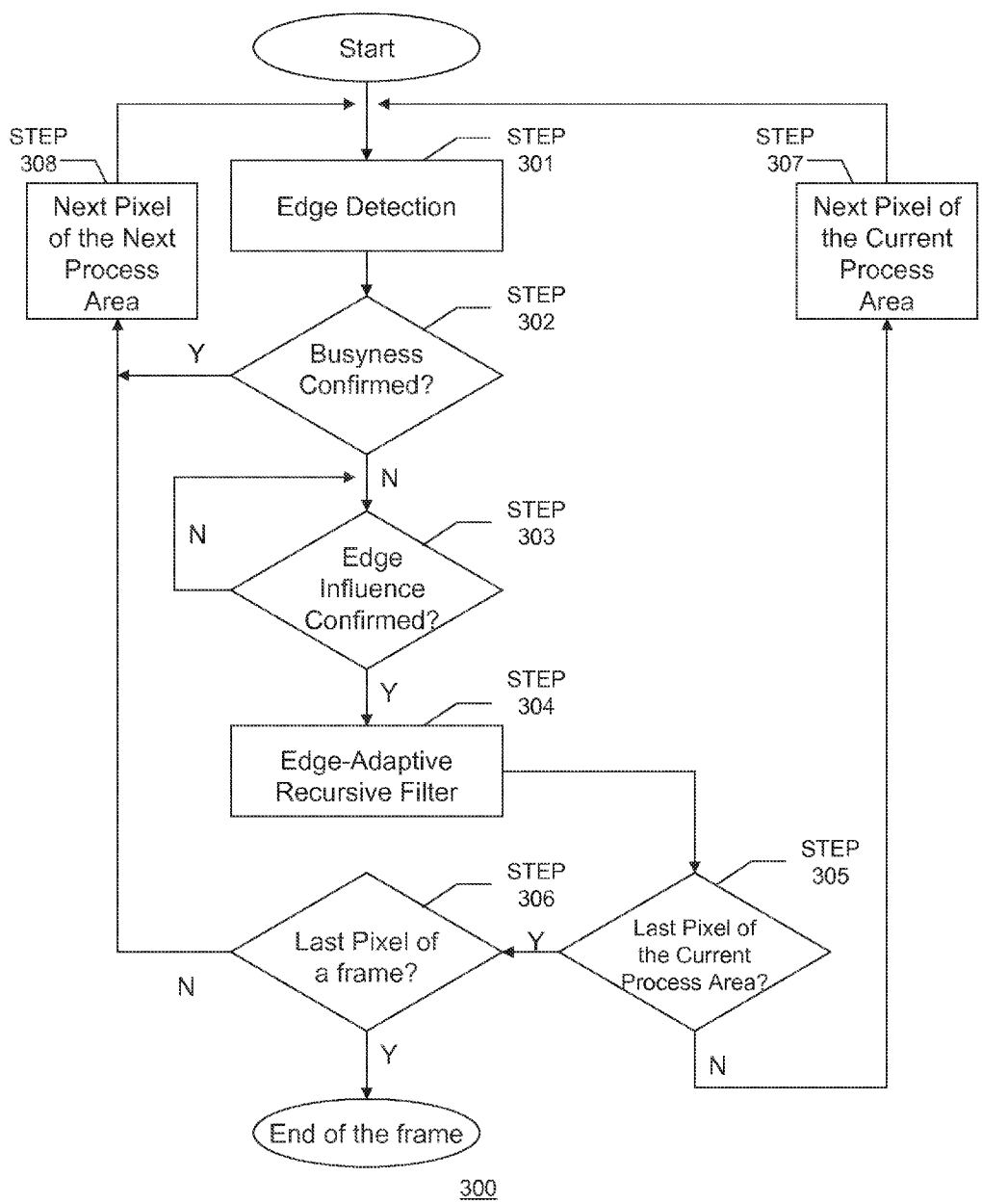
FIG. 3 shows a flowchart for edge-adaptive and recursive non-linear filtering of ringing effect, in accordance with an embodiment of the invention.
Figure 4:
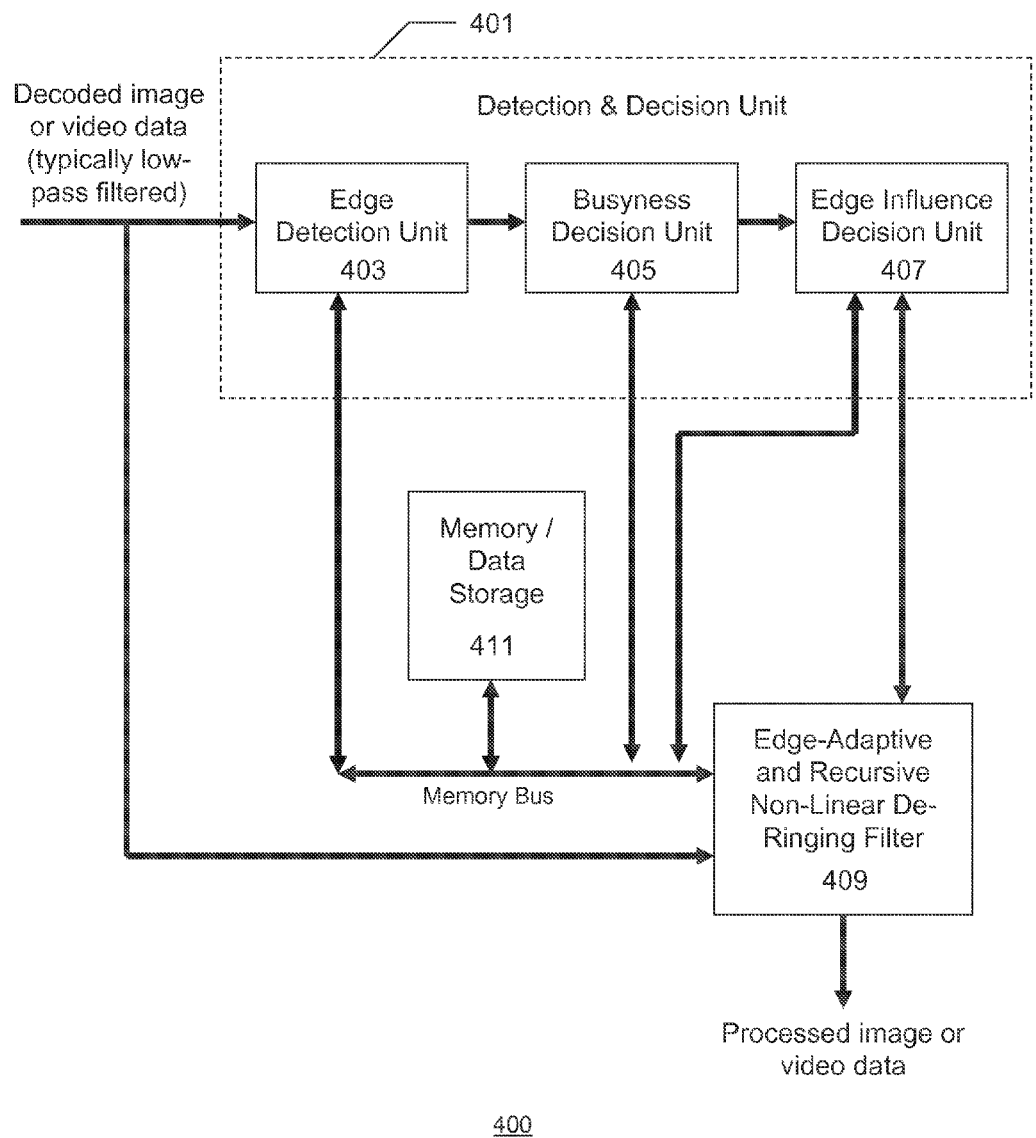
FIG. 4 shows a system block diagram for edge-adaptive and recursive non-linear filtering of ringing effect, in accordance with an embodiment of the invention.

In a preferred embodiment of the invention, the edge-adaptive and recursive non-linear filter, which is shown in and described for FIG. 3 and FIG. 4, is applied to decoded and/or decompressed image or video data to filter, reduce, and/or eliminate the ringing effect present on the decoded and/or decompressed image or video data. The dotted haze surrounding the edges (101, 103, 105) in FIG. 1 are pre-filtered examples of ringing effects in an image. In contrast, the crisper and cleaner edges (201, 203, 205) of objects in FIG. 2 represent an example of a filtered image after applying the edge-adaptive and recursive non-linear filter in accordance with an embodiment of the invention.

FIG. 3 shows a flowchart (300) for edge-adaptive and recursive non-linear filtering of ringing effect from a single frame, in accordance with an embodiment of the invention. This single frame may be a still image in one embodiment. In another embodiment, the single frame may be one of many sequential frames in video data. In a preferred embodiment of the invention, the flowchart (300) in FIG. 3 represents ringing effect detection and filtering decision algorithms and edge-adaptive and recursive non-linear de-ringing filtering. There are two general tasks involved in edge-adaptive, recursive, and non-linear filtering of ringing effects in images and videos. The first task is detecting where the ringing effects occur in original image or video data, and then identifying and/or separating the ringing effect-influenced data from the original image or video data. The second task is non-linearly filtering, reducing, and/or eliminating the ringing effects from the ringing effect-influenced data.

As shown in the flowchart (300) of FIG. 3, the edge-adaptive and recursive non-linear filtering of ringing effects involve a multiple number of analysis and decision steps in accordance with one or more embodiments of the invention. First, in the preferred embodiment of the invention, an "edge detection" method identifies and counts large or all edges in a process area within image or video data, as shown in STEP 301. Preferably, edge detection-related methods and any subsequently-utilized methods in later processes may be an intra-frame or inter-frame process. In one embodiment of the invention, the process area may be defined as an analytical window with twice the size of a discrete cosine transform (DCT) block size in an horizontal axis and also with twice the size of the DCT block size in a vertical axis, for a total window size of four times the size of the DCT block size. In another embodiment of the invention, the process area for the edge detection method and other subsequent methods may be in different sizes, depending on the need of a particular ringing effect filtering application. For example, the size of the process area for the edge detection method and other subsequent methods may be in integer multiples (n) of the DCT block size in the horizontal axis and/or the vertical axis.

In the preferred embodiment of the invention, the "edge detection" method, as shown in STEP 301, searches all edges within the process area containing the current pixel being analyzed. The edge detection method also derives each edge slope direction and each edge signal level value. For example, in the preferred embodiment of the invention, the edge detection method may involve the following computational and analytical processes:

First, the edge detection method assumes that the current pixel is $P(X_c, Y_c)$, and any pixel in the process area is $P(X, Y)$. Following this assumption, the horizontal differential is $V_H = P(X, Y) - P(X+1, Y)$, and the vertical differential is $V_V = P(X, Y) - P(X, Y+1)$. The edge vector is then defined as $V = V_H \mathbf{i} + V_V \mathbf{j}$.

If one were to visualize the edge vector, the edge vector at (x, y) points is in the direction of the greatest gradient. Furthermore, if there is a step/edge in the process area of an image (i.e. a current frame under filtering analysis), gradient vectors point perpendicularly (i.e. orthogonally) to the step/edge. The edge detection method in the preferred embodiment of the invention can set a threshold to capture only large vectors corresponding to large steps/edges that cause ringing artifacts. The derivations and calculations of vector fields in the edge detection method also assist determination of filtering angles (e.g. 0 degree, 45 degree, 90 degree, 135 degree, and etc.), if the edge-adaptive and recursive non-linear de-ringing filter were to be applied in subsequent steps.

For the edge detection method in accordance with the preferred embodiment of the invention, we define an indicator function and a counting measure as follows:

$$isStep(X, Y) = \begin{cases} 1, & \|V(X, Y)\| > \text{Threshold 5} \\ 0, & \text{else} \end{cases}$$

In the preferred embodiment of the invention, "Threshold 5" is selected to count only large edges above an edge size threshold value, while not counting small edges below the edge size threshold value. In general, threshold values are empirically found or determined, and may be customized by a de-ringing filter designer, depending on the need of a particular application.

Furthermore, in the preferred embodiment of the invention, a counting function called "StepCount" is defined as sum of the values of the indicator function "isStep" within the process area, as shown below:

$$StepCount(X_c, Y_c) = \Sigma isStep(X, Y),$$

where X, Y are within the process area, and where StepCount $(X_c, Y_c)$ provides the total number of large edges within the process area.

At the end of the process for the edge detection method, large edges within each process area are identified, and the total number of large edges within each process area is calculated for subsequent filtering decision steps.

Continuing with the flowchart (300) in FIG. 3, after processing the edge detection method as described above and as shown in STEP 301, a "busyness" decision method in STEP 302 can determine whether the process area is a "non-busy" area or a "busy" area, based on a "busyness" measure relative to empirically-defined threshold values. The term "busyness," as described previously, is defined as having many detailed and fine textures in the process area that includes a current pixel being analyzed and adjacent pixels near the current pixel. In general, the process area is a portion of image data (i.e. the current frame) for determining a need to apply the edge-adaptive and recursive non-linear de-ringing filter or not.

In the preferred embodiment of the invention, the busyness measure can be defined as the sum of difference amounts in the process area without counting large edges, as further elaborated by the following formula:

$$\Sigma_H(X_c, Y_c) = \Sigma(1 - isStep(X,Y))|V_H|/(\text{TotalPixel} - \text{StepCount}(X_c, Y_c))$$

$$\Sigma_V(X_c, Y_c) = \Sigma(1 - isStep(X,Y))|V_V|/(\text{TotalPixel} - \text{StepCount}(X_c, Y_c))$$

In the preferred embodiment of the invention, the busyness decision method may decide to apply the edge-adaptive and recursive non-linear de-ringing filter, if the following boundary and threshold condition is satisfied:

StepCount>CT2 and Threshold 6>$\Sigma_H$>Threshold 7 and Threshold 6>$\Sigma_V$>Threshold 7

Based on empirically-defined threshold values and boundaries, in this embodiment of the invention, StepCount>CT2 means that there are some large edges in the process area that may cause the ringing effect (i.e. mosquito noise). Furthermore, for this embodiment, "Threshold 7" is defined as the noise level, and if the busyness measure is smaller than the noise level, then the busyness decision method in STEP 302 can presume that the process area is a "flat" area which does not need to be filtered. On the other hand, if the busyness measure is larger than "Threshold 6" in this embodiment of the invention, it means there are too many small edges in the process area, which also does not need to be filtered. Therefore, a boundary condition defined by at least two threshold values, as shown above, can determine the "non-busy" area that requires application of the edge-adaptive and recursive non-linear de-ringing filter. In another embodiment of the invention, boundary conditions and their related threshold values may be set differently, depending on a particular need of a filtering application.

For the busyness decision method as shown in STEP 302, if the process area is determined to be "non-busy," then, a subsequent process, such as an edge influence decision process as shown in STEP 303, is utilized to further determine the need for applying the edge-adaptive and recursive non-linear de-ringing filter. On the other hand, if the process area is determined to be too "busy" relative to the empirically-defined threshold values and boundary conditions, then the busyness decision method may decide not to filter the current process area, and move on to a next process area for analysis, as shown in STEP 308 in FIG. 3.

If the process area is determined to be "non-busy" based on the busyness decision method, the edge influence decision method further determines how to apply edge-adaptive and recursive non-linear de-ringing filter, as shown by STEP 303 in FIG. 3. In the preferred embodiment of the invention, the edge influence decision method determines whether each counted and identified edge has sufficient influence to the current pixel being analyzed. If each counted and identified edge is determined to have sufficient influence to the current pixel, then the ringing effect detection and filtering decision algorithm decides to filter the current pixel by utilizing the edge-adaptive and recursive non-linear de-ringing filter, as shown in STEP 304. On the other hand, if the current identified edge is determined to have insufficient influence to the current pixel, the edge influence decision method can iterate to the next identified edge, if any, to determine whether the next identified edge has sufficient influence to the current pixel, as shown in STEP 303. If there are a multiple number of edges that have sufficient influence to the current pixel, then the current pixel may be filtered a multiple number of times during the edge-adaptive and recursive non-linear de-ringing filtering. Once all of the counted and identified edges relative to the current pixel have been analyzed for edge influence, the ringing effect detection and filtering decision algorithm moves on to the next pixel of the current process area for analysis.

In the preferred embodiment of the invention, it should be noted that for the current pixel $P(X_c, Y_c)$, any pixel $P(X,Y)$ on a large edge within the process area could generate the ringing effect (i.e. the mosquito effect) on it. Furthermore, the magnitude of the ringing effect is generally positively proportional to the signal value of the large edge, and is also inversely proportional to the distance between $P(X, Y)$ and $P(X_c, Y_c)$. In one embodiment of the invention, the edge influence function utilized to determine the edge influence is defined as follows:

$$[V_H^*(X-X_c)+V_V^*(Y-Y_c)]/[(X-X_c)^2+(Y-Y_c)^2] > \text{Threshold 9}$$

If this edge influence function is satisfied, for each pixel $P(X, Y)$ in the process area, the current pixel can be filtered once. If the edge influence function is not satisfied, no filtering may need to be applied, and the ringing effect detection and filtering decision algorithm moves on to the next pixel of the current process area for analysis. In another embodiment of the invention, the edge influence function may be defined by another appropriate formula optimized for a particular de-ringing application.

Continuing with FIG. 3, the edge-adaptive and recursive non-linear de-ringing filter shown in STEP 304 is a three-pixel angled recursive filter in the preferred embodiment of the invention. For the three-pixel angled recursive filter, only three adjacent pixels (e.g. pixel "a," pixel "b," and pixel "c") need to be utilized for analysis. For edge-adaptive and angle-adaptive filtering, four different angles, including horizontal, vertical, 45 degrees, and 135 degrees, may be taken into account for filtering of the current pixel.

In the preferred embodiment of the invention, for the current pixel, c, if each pixel meets the condition from the edge influence decision method and the edge influence decision function, then the filter angle and adjacent pixels a and b can be selected as shown below:

$\Theta = \arctan(V_V/V_H)$ and $\delta = 45/2$

If $0-\delta < \Theta \leq 0+\delta$ then $a=P(X_c-1, Y_c)$, $b=P(X_c+1, Y_c)$
If $45-\delta < \Theta \leq 45+\delta$ then $a=P(X_c-1, Y_c-1)$, $b=P(X_c+1, Y_c+1)$
If $-45-\delta < \Theta \leq -45+\delta$ then $a=P(X_c-1, Y_c+1)$, $b=P(X_c+1, Y_c-1)$
If $-90+\delta < \Theta \leq 90-\delta$ then $a=P(X_c, Y_c+1)$, $b=P(X_c, Y_c-1)$ Furthermore, in the preferred embodiment of the invention, the edge-adaptive and recursive non-linear de-ringing filter can be defined as follows:

If [(c<a and c<b)
or (c>a and c>b)
or (c<a and c==b)
or (c==a and c<b)
or (c>a and c==b)
or (c==a and c>b)]
and $|a-c| < \|V(x, y)\|/5$ and $|c-b| < \|V(x, y)\|/5$ $$C_{n+1} = \frac{(A \cdot a + B \cdot b + C \cdot c)}{A+B+C}$$

otherwise $c_{n+1}=c_n$

The filtering conditions, as shown in above example, determine that the filter is only applied for a single pixel transition, and when the current pixel transition level is smaller than 20 percent of the value of the edge. In another embodiment, the filter may be applied when the current pixel transition level is another percentage of the value of the edge, instead of 20 percent. Furthermore, the non-linear and recursive aspect of the filter is shown by the filtering conditions above, which replaces the value of c with a filtered value. In the preferred embodiment of the invention with the above filtering conditions, it may be desirable to limit the maximum possible filter iteration to three times. In other embodiments, it may be desirable to limit the maximum possible filter iteration to another integer number other than three. Because there are four angles (e.g. horizontal, vertical, 45 degrees, and 135 degrees) in angle-adaptive and edge-adaptive filtering in the preferred embodiment, each current pixel can be filtered 12 times from all directions. In another embodiment of the invention, the number of angles and the number of possible filter iteration may be set differently, depending on the need of a particular de-ringing filter application.

Once the edge-adaptive and recursive non-linear de-ringing filter in STEP 304 completes desired filtering to the current pixel, the ringing effect detection and filtering decision algorithm embodied by the flowchart (300) in FIG. 3 checks whether the current pixel is the last pixel of the current process area, as shown in STEP 305. If the current pixel is not the last pixel of the current process area, then the ringing effect detection and filtering decision algorithm can assign a next pixel of the current process area as the new current pixel, as shown in STEP 307, and the ringing effect detection and filtering decision algorithm loops back to the edge detection method in STEP 301.

On the other hand, if the current pixel is the last pixel of the current process area, as also shown in STEP 305, then the ringing effect detection and filtering decision algorithm additionally checks whether the current pixel is the last pixel of a current frame (e.g. a still image, a frame from a plurality of frames in video data, and etc.), as shown in STEP 306. If the current pixel is the last pixel of the current frame, then the ringing effect detection and filtering decision algorithm has finished processing all pixels in the current frame data, so the process ends for the current frame, as shown in the flowchart (300). For video data, a frame sequenced after the current frame may go through all of the steps outlined in the flowchart (300) for the edge-adaptive and recursive non-linear filtering of ringing effect. In contrast, if the current pixel is not the last pixel of the current frame data, then the ringing effect detection and filtering decision algorithm assigns a next process area as the new current process area, and a pixel in the next process area as the new current pixel, as shown in STEP 308. Then, the ringing effect detection and filtering decision algorithm loops back to the edge detection method in STEP 301, as shown in the flowchart (300).

In one embodiment of the invention, each process and decision step in the flowchart (300) may be implemented in a computer software executed on a programmable device and/or another hardware device, such as a graphics processor unit (GPU), a field programmable gate array (FPGA), a central processing unit (CPU), and a memory unit of a computing device or another electronic device. In another embodiment of the invention, each process and decision step in the flowchart (300) may be at least partly hardwired and/or embedded in an application-specific integrated circuit (ASIC), another semiconductor chip, or another hardware component in a television, a display projector, a smart phone, or another electronic device.

FIG. 4 shows a system block diagram (400) for edge-adaptive and recursive non-linear filtering of ringing effect, in accordance with an embodiment of the invention. In this embodiment of the invention, a detection and decision unit (401) comprises an edge detection unit (403), a busyness decision unit (405), and an edge influence decision unit (407). Each unit (403, 405, 407) in the detection and decision unit (401) in this example is operatively connected to a memory and/or data storage (411) for performing edge detection, busyness decision, and/or edge influence decision processes. Furthermore, an edge-adaptive and recursive non-linear de-ringing filter (409) is also operatively connected to the memory and/or data storage (411) for retrieving metadata from the detection and decision unit (401) or any other pertinent data stored in the memory and/or data storage (411). In this embodiment of the invention, the detection and decision unit (401) detects and determines whether to filter a current pixel in a current process area or not, based on the ringing effect detection and filtering decision algorithm involving multiple number of process and decision steps (i.e. STEPs 301~308 of FIG. 3), which have been previously described. In one embodiment of the invention, the detection and decision unit (401) may take decoded image or video data as input for selection of process areas in the ringing effect detection and filtering decision algorithm. Typically, the decoded image or video data are low-pass filtered during decoding and/or decompression, which may cause or add multi-dimensional ringing effects, such as dotted haze in an image or flickers in a video, to the original version of the image or video data. In another embodiment of the invention, the detection and decision unit (401) may take pre-decoded image or video data as input data.

In the embodiment of the invention as shown in FIG. 4, the edge detection unit (403) identifies and counts large or all edges in a process area within image or video data, wherein the process area may be defined as an analytical window with twice the size of a discrete cosine transform (DCT) block size in an horizontal axis and also with twice the size of the DCT block size in a vertical axis, for a total window size of four times the size of the DCT block size. In another embodiment of the invention, the process area defined by the edge detection unit (403) may be in different sizes, depending on the need of a particular ringing effect filtering application.

The edge detection unit (403) is capable of searching all edges within the process area containing the current pixel being analyzed. The edge detection unit (403) can also derive each edge slope direction and each edge signal level value. At the end of the process from the edge detection unit (403), large edges within each process area are identified, and the total number of large edges within each process area is calculated for subsequent processing by other units.

Continuing with the system block diagram (400) in FIG. 4, after identifying and counting the large edges with each process area from the edge detection unit (403), the busyness decision unit (405) determines whether the process area is a "non-busy" area or a "busy" area, based on a "busyness" measure relative to empirically-defined threshold values. The busyness measure can be defined as the sum of difference amounts in the process area without counting large edges. Furthermore, the busyness decision unit (405) may decide to apply the edge-adaptive and recursive non-linear de-ringing filter (409), if certain boundary and threshold condition is satisfied, which typically involves at least two threshold values to determine the "non-busy" area.

Based on empirically-defined threshold values and boundaries, some large edges in the process area that may cause the ringing effect (i.e. mosquito noise) are further identified, and their related process areas are also identified as the "non-busy" areas by the busyness decision unit (405) for potentially positive determination for filtering in subsequent processes. Furthermore, areas with smaller busyness measures than an empirically-defined noise level can be presumed to be "flat" that do not require filtering. Moreover, if there are too many small edges in a process area, with the busyness measure larger than a certain threshold value, then the busyness decision unit (405) determines that process area also does not need to be filtered. In general, if the process area is determined to be too "busy" relative to the empirically-defined threshold values and boundary conditions, then the busyness decision unit (405) may decide not to filter the current process area, and move on to a next process area for analysis.

A particular method of providing the busyness decision associated with the busyness decision unit (405) has been previously described for FIG. 3, with specific boundary and threshold condition examples as the preferred embodiment of the invention. In other embodiments of the invention, boundary conditions and their related threshold values may be set differently, depending on a particular need of a filtering application.

Once the process area is determined to be "non-busy" by the busyness decision unit (405), the edge influence decision unit (407) can further determine the need for applying the edge-adaptive and recursive non-linear de-ringing filter (409). In one embodiment of the invention, the edge influence decision unit (407) determines whether each counted and identified edge has sufficient influence to the current pixel being analyzed. If each counted and identified edge is determined to have sufficient influence to the current pixel, then the ringing effect detection and filtering decision algorithm decides to filter the current pixel by utilizing the edge-adaptive and recursive non-linear de-ringing filter (409). On the other hand, if the current identified edge is determined to have insufficient influence to the current pixel, the edge influence decision method can iterate to the next identified edge, if any, to determine whether the next identified edge has sufficient influence to the current pixel. If there are a multiple number of edges that have sufficient influence to the current pixel, then the current pixel may be filtered a multiple number of times by the edge-adaptive and recursive non-linear de-ringing filter (409). Once all of the identified edges relative to the current pixel have been analyzed for edge influence, the ringing effect detection and filtering decision algorithm moves on to the next pixel of the current process area for analysis.

Because the current pixel on a large edge within the process area may generate the ringing effect (i.e. the mosquito effect), and because the magnitude of the ringing effect is generally positively proportional to the signal value of the large edge and inversely proportional to the distance between the current pixel and other pixels, an edge influence function processed in the edge influence decision unit (407) takes account of these characteristics for making a decision to filter the current pixel. For the preferred embodiment of the invention, a particular edge influence function has been shown and described previously for FIG. 3. In other embodiments of the invention, a different edge influence function with different formulas may be utilized, depending on a particular need in a de-ringing filter application.

Continuing with the system block diagram (400) in FIG. 4, in one embodiment of the invention, the edge-adaptive and recursive non-linear de-ringing filter (409) is a three-pixel angled recursive filter. For the three-pixel angled recursive filter, only three adjacent pixels (e.g. pixel "a," pixel "b," and pixel "c") need to be utilized for analysis. For edge-adaptive and angle-adaptive filtering, four different angles, including horizontal, vertical, 45 degrees, and 135 degrees, may be taken into account for filtering of the current pixel. In one embodiment of the invention, filter angles and adjacent pixel selections can be completed in the edge-adaptive and recursive non-linear de-ringing filter (409), in accordance with the previously-described method associated with STEP 304 in FIG. 3. In another embodiment of the invention, another method for filter angle and adjacent pixel selections may be utilized, depending on a particular need of a de-ringing filter application.

Preferably, in various embodiments of the invention, the edge-adaptive and recursive non-linear de-ringing filter (409) is capable of recursively and non-linearly filtering the current pixel by replacing the value of the current pixel with a filtered value. Furthermore, an exit condition is typically implemented in the edge-adaptive and recursive non-linear de-ringing filter (409), such as limiting the maximum possible filter iteration to three times per pixel for four angles, as shown in the previously-described method associated with STEP 304 in FIG. 3. The number of angles and the number of possible filter iteration per pixel may be set differently, depending on the need of a particular de-ringing filter application.

After the edge-adaptive and recursive non-linear de-ringing filter (409) completes adjustment of the current pixel in the process area with one or more filtered values, any filtered output information associated with adjustments to the current pixel can be stored in the memory and/or data storage (411), or outputted as processed image or video data, as shown in the system block diagram (400) in FIG. 4. The memory and/or data storage (411) may be a memory unit, a hard disk drive, another data storage unit, or a combination thereof.

In one embodiment of the invention, each process and decision involved in the detection and decision unit (401), as shown in the system block diagram (400) in FIG. 4, may be implemented in a software program executed on a programmable device and/or another hardware device, such as a graphics processor unit (GPU), a field programmable gate array (FPGA), a central processing unit (CPU), and a memory unit of a computing device or another electronic device. In another embodiment of the invention, each process and decision involved in the detection and decision unit (401) may be at least partly hardwired and/or embedded in an application-specific integrated circuit (ASIC), another semiconductor chip, or another hardware component in a television, a display projector, a smart phone, or another electronic device.

Various embodiments of the invention of have been described above and also illustrated in part by FIGS. 2~4. The present invention provides several advantages over conventional linear de-ringing filters and related methods of filtering ringing effects in image and video data. For example, one advantage is that the novel de-ringing filter in accordance with an embodiment of the invention can effectively reduce undesirable ringing artifacts for a variety of video and imaging compression standards by staying compression standard-independent.

Another advantage is that the novel de-ringing filter in accordance with an embodiment of the invention can be edge-adaptive, recursive, and linear, thereby providing an excellent mosquito noise and ringing effect filtering performance, compared to many linear and conventional de-ringing filters.

Yet another advantage is that the novel de-ringing filter in accordance with an embodiment of the invention can provide design flexibility to a de-ringing filter designer, because the novel de-ringing filter can be implemented together with a conventional low pass filter, or as a separate module and a process outside of the conventional low pass filter.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for edge-adaptive and recursive non-linear filtering of ringing effect on video or image data, the method comprising:

executing a ringing effect detection and filtering decision process and an edge-adaptive and recursive non-linear de-ringing filtering process on a memory unit and at least one of a programmable device and another hardware device, wherein the ringing effect detection and filtering decision process defines a process area including a current pixel for analysis;

detecting and counting one or more edges above an edge size threshold value in the process area by executing an edge detection process as part of the ringing effect detection and filtering decision process executed on the memory unit and at least one of the programmable device and another hardware device;

determining whether the process area is a "non-busy" area or a "busy" area, based on a "busyness" measure relative to empirically-defined threshold values and the one or more edges counted from the edge detection process; and when the process area is the "non-busy" area:
  determining whether a counted and identified edge exceeds an edge influence threshold to the current pixel by utilizing an edge influence function, which is positively proportional to a signal value of a large edge, and inversely proportional to a distance between the current pixel and another pixel on the counted and identified edge; and
  when the counted and identified edge is determined to exceed the edge influence threshold to the current pixel:
    filtering the current pixel by utilizing the edge-adaptive and recursive non-linear de-ringing filtering process that are angle-adaptive for horizontal, vertical, and diagonal angles for the current pixel.

2. The method of claim 1, further comprising a step of assigning a next pixel as a new current pixel, and a next process area as a new process area, and looping back to the step of detecting and counting the one or more edges above the edge size threshold value, when the process area is determined to be the "busy" area.

3. The method of claim 1, further comprising a step of determining whether a next counted and identified edge exceeds the edge influence threshold to the current pixel, when the counted and identified edge is not determined to exceed the edge influence threshold.

4. The method of claim 1, further comprising a step of checking whether the current pixel is a last pixel of the process area.

5. The method of claim 4, further comprising a step of assigning a next pixel of the process area as a new current pixel, when the current pixel is not the last pixel of the process area.

6. The method of claim 4, further comprising a step of checking whether the current pixel is a last pixel of the video or image data, when the current pixel is the last pixel of the process area.

7. The method of claim 6, further comprising a step of assigning a next pixel as a new current pixel, and a next process area as a new process area, and looping back to the step of detecting and counting the one or more edges above the edge size threshold value, when the current pixel is not the last pixel of the process area.

8. The method of claim 1, wherein the edge-adaptive and recursive non-linear de-ringing filtering process reduces, filters, or eliminates the ringing effect on the video or image data.

9. The method of claim 1, wherein the diagonal angles include 45-degree and 135-degree angles for edge-adaptive de-ringing of the current pixel, and wherein the current pixel is recursively filtered up to one or more times per pixel per each angle direction.

10. The method of claim 1, wherein the edge-adaptive and recursive non-linear de-ringing filtering process utilizes three adjacent pixels including the current pixel, and limits a maximum possible filter iteration per each angle direction of the current pixel to one or more times.

11. The method of claim 1, wherein the step of filtering the current pixel by utilizing the edge-adaptive and recursive non-linear de-ringing filtering process only filters the current pixel when a current pixel transition level is a percentage of a value of the counted and identified edge.

12. The method of claim 1, wherein the edge detection process does not count small edges below the edge size threshold value.

13. The method of claim 1, wherein the process area is a portion of the video or image data, and has a horizontal length equal to a multiple of a size of a discrete cosine transform (DCT) block size, and a vertical length equal to the multiple of the size of the discrete cosine transform (DCT) block size.

14. The method of claim 1, wherein the current pixel is filtered in a direction orthogonal to the counted and identified edge.

15. A system for edge-adaptive and recursive non-linear filtering of ringing effect on video or image data, the system comprising:
  a detection and decision unit comprising an edge detection unit, a busyness decision unit, and an edge influence decision unit, wherein the detection and decision unit receives image or video data as input, and wherein the detection and decision unit is executed on a memory unit and at least one of a programmable device and another hardware device;
  an edge-adaptive and recursive non-linear de-ringing filter that recursively places a filtered value in a current pixel within a process area to reduce or remove the ringing effect on the current pixel, wherein the filtered value is recursively adjusted by being edge-adaptive and angle-adaptive with horizontal, vertical, and diagonal angles, when the detection and decision unit decides to adjust the current pixel within the process area under analysis;
  the edge influence decision unit that determines whether a counted and identified edge exceeds an edge influence threshold to the current pixel by utilizing an edge influence function, which is positively proportional to a signal value of a large edge, and inversely proportional to a distance between the current pixel and another pixel;
  a data storage storing the filtered value from the edge-adaptive and recursive non-linear de-ringing filter; and
  the memory unit and at least one of the programmable device and another hardware device.

16. The system of claim 15, wherein the edge detection unit detects and counts one or more edges above an edge size threshold value for each process area.

17. The system of claim 16, wherein the busyness decision unit determines whether the process area is a "non-busy" area or a "busy" area, based on a "busyness" measure relative to empirically-defined threshold values and the one or more edges counted from the edge detection unit.

18. The system of claim 15, wherein the edge-adaptive and recursive non-linear de-ringing filter adjusts the current pixel with a filtered value, if the counted and identified edge is determined to exceed the edge influence threshold to the current pixel.

19. The system of claim 15, wherein the diagonal angles include 45-degree and 135-degree angles for edge-adaptive de-ringing of the current pixel, and wherein the current pixel is recursively filtered up to one or more times per pixel per each angle direction.

20. The system of claim 15, wherein the edge-adaptive and recursive non-linear de-ringing filter utilizes three adjacent pixels including the current pixel, and limits a maximum possible filter iteration per each angle direction of the current pixel to one or more times.

21. The system of claim 15, wherein the edge-adaptive and recursive non-linear de-ringing filter only filters the current pixel when a current pixel transition level is a percentage of a value of the counted and identified edge.

22. The system of claim 15, wherein the edge detection unit does not count small edges below an edge size threshold value.

23. The system of claim 15, wherein the process area is a portion of the video or image data, and has a horizontal length equal to a multiple of a size of a discrete cosine transform (DCT) block size, and a vertical length equal to the multiple of the size of the discrete cosine transform (DCT) block size.

24. The system of claim 15, wherein the current pixel is filtered in a direction orthogonal to a counted and identified edge.

* * * * *